(12) United States Patent
Ren et al.

(10) Patent No.: US 8,315,139 B2
(45) Date of Patent: Nov. 20, 2012

(54) SERVO STRUCTURE IN SINGLE-BIT HOLOGRAPHIC VOLUME RECORDING AND READOUT

(75) Inventors: Zhiyuan Ren, Malta, NY (US); Xiaolei Shi, Niskayuna, NY (US); Victor Petrovich Ostroverkhov, Ballston Lake, NY (US); Xuefeng Wang, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/981,293

(22) Filed: Dec. 29, 2010

(65) Prior Publication Data

US 2012/0170438 A1 Jul. 5, 2012

(51) Int. Cl.
*G11B 7/00* (2006.01)
(52) U.S. Cl. .......................................... 369/103
(58) Field of Classification Search .................. 369/103, 369/94, 44.32, 44.37, 44.29, 53.19
See application file for complete search history.

(56) References Cited

U.S. PATENT DOCUMENTS

| | | | |
|---|---|---|---|
| 2004/0062178 A1* | 4/2004 | Horimai | 369/103 |
| 2008/0068959 A1 | 3/2008 | Saito | |
| 2008/0089209 A1* | 4/2008 | Miyamoto et al. | 369/112.23 |
| 2008/0239922 A1* | 10/2008 | Fujita et al. | 369/103 |
| 2009/0003153 A1* | 1/2009 | Yamatsu | 369/44.38 |
| 2009/0175138 A1* | 7/2009 | Kim et al. | 369/44.11 |
| 2010/0046338 A1* | 2/2010 | Saito et al. | 369/103 |

FOREIGN PATENT DOCUMENTS

| | | |
|---|---|---|
| EP | 2204799 A1 | 7/2010 |
| JP | 2009151901 A | 7/2009 |

OTHER PUBLICATIONS

EP Search Report; Application No. 11194550.7-1232; Mar. 28, 2012, pp. 1-11.

* cited by examiner

*Primary Examiner* — Thang Tran
(74) *Attorney, Agent, or Firm* — Jean Testa; Fletcher Yoder (57) ABSTRACT

Methods and systems are provided for recording micro-holograms in a holographic disk. Disk tilting or disk imperfections may cause counter-propagating recording and reference beams to deviate from the target data position in the disk. In some embodiments, a tracking beam is directed to a tracking position in the disk, and deviation of the tracking beam from the tracking position may indicate tracking and/or focusing errors of the recording and/or reference beams. A detector may generate an error signal in response to such errors. A first servo-mechanical system may actuate a first optical head (e.g., transmitting the reference and tracking beams) to compensate for such errors, and a second servo-mechanical system may actuate a second optical head (e.g., transmitting the recording beam) to follow the actuation of the first servo system, such that an interference of the reference beam and the recording beam may be maintained in the target data position.

36 Claims, 5 Drawing Sheets

SERVO STRUCTURE IN SINGLE-BIT HOLOGRAPHIC VOLUME RECORDING AND READOUT

BACKGROUND

The present techniques relate generally to bit-wise holographic data storage techniques. More specifically, the techniques relate to employing servo-mechanical components in holographic storage systems.

As computing power has advanced, computing technology has entered new application areas, such as consumer video, data archiving, document storage, imaging, and movie production, among others. These applications have provided a continuing push to develop data storage techniques that have increased storage capacity and increased data rates.

One example of the developments in data storage technologies may be the progressively higher storage capacities for optical storage systems. For example, the compact disc, developed in the early 1980s, has a capacity of around 650-700 MB of data, or around 74-80 minutes of a two channel audio program. In comparison, the digital versatile disc (DVD) format, developed in the early 1990s, has a capacity of around 4.7 GB (single layer) or 8.5 GB (dual layer). Furthermore, even higher capacity storage techniques have been developed to meet increasing demands, such as the demand for higher resolution video formats. For example, high-capacity recording formats such as the Blu-ray Disc™ format is capable of holding about 25 GB in a single-layer disk, or 50 GB in a dual-layer disk. As computing technologies continue to develop, storage media with even higher capacities may be desired. Holographic storage systems and micro-holographic storage systems are examples of other developing storage technologies that may achieve increased capacity requirements in the storage industry.

Holographic storage is the storage of data in the form of holograms, which are images of three dimensional interference patterns created by the intersection of two beams of light in a photosensitive storage medium. Both page-based holographic techniques and bit-wise holographic techniques have been pursued. In page-based holographic data storage, a signal beam containing digitally encoded data (e.g., a plurality of bits) is superposed on a reference beam within the volume of the storage medium resulting in a chemical reaction which modulates the refractive index of the medium within the volume. Each bit is therefore generally stored as a part of the interference pattern. In bit-wise holography or micro-holographic data storage, every bit is written as a micro-hologram, or Bragg reflection grating, typically generated by two counter-propagating focused recording beams. The data is then retrieved by using a read beam to reflect off the micro-hologram to reconstruct the recording beam.

Bit-wise holographic systems may enable the recording of closer spaced and layer-focused micro-holograms, thus providing much higher storage capacities than prior optical systems. However, due to the close configuration of micro-holograms in higher storage capacities may result in reading and/or replication errors if the read and/or recording beams deviate from impinging on the desired micro-hologram or position in the optical media. Moreover, higher data transfer rates are generally desirable, but faster rates may correspond to faster disk rotation speeds, which further increases the probability of reading and/or replication errors. Techniques for bit-wise micro-holographic reading and/or recording with decreased errors may be advantageous.

BRIEF DESCRIPTION

An embodiment of the present techniques provides a method of recording data in a holographic disk in a replication system. The method includes rotating the holographic disk, tracking a reference track in the holographic disk to determine a movement measurement, actuating a first optical head over a first surface of the holographic disk, based on the movement measurement, and focusing a first beam from the first optical head towards a data position in the holographic disk. The method further includes focusing a second beam from a second optical head to counter-propagate and overlap with the first beam to record data in the data position in the holographic disk, determining an overlap misalignment between the first and the second beam, and actuating the second optical head over the second surface (opposite the first surface) of the holographic disk, based on the overlap misalignment.

Another embodiment provides a system for recording micro-holograms on a holographic disk. The system includes at least a servo-mechanical system and two optical heads. The servo-mechanical system includes a first actuator and a second actuator. The first actuator is configured to actuate a first optical head in one or more of an axial direction and a radial direction with respect to a first side of the holographic disk, where the first optical head is configured to focus a reference beam in a data position from the first side of the holographic disk. The second actuator is configured to actuate a second optical head in one or more of an axial direction, a radial direction, and a tangential direction with respect to a second side (opposite the first side) of the holographic disk, based on the actuation of the first actuator, where the second optical head is configured to focus a recording beam to interfere with the reference beam in the data position from the second side of the holographic disk.

Another embodiment provides a system for pre-formatting a holographic disk. The system includes a first optical head configured to focus a reference beam to a data position in the holographic disk, focus a tracking beam to a reference track in the holographic disk, where a reflection of the tracking beam indicates the focus of the reference beam on the data position, and receive the reflection of the tracking beam from the reference track. The system also includes a second optical head configured to focus a signal beam to overlap and interfere with the reference beam at the data position, where the signal beam is counter-propagating with the reference beam. The system includes a first servo-mechanical system configured to actuate optical components in the first optical head based on the reflection of the tracking beam. Furthermore, the system includes a second servo-mechanical system configured to actuate optical components in the second optical head based on the transmission of one or more of the reference beam and the signal beam.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for one of ordinary skill having the benefit of this disclosure.

Figure 1:
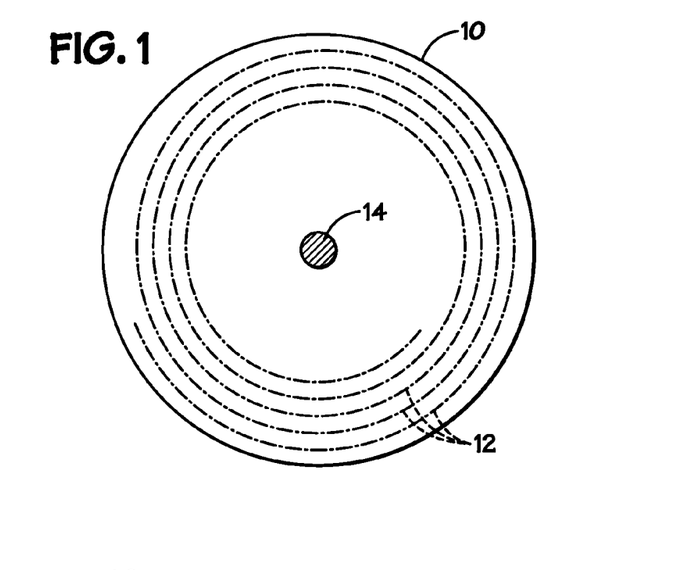
FIG. 1 illustrates an optical disk having data tracks, in accordance with embodiments.

Bit-wise holographic data storage systems typically involve recording by emitting two overlapping and interfering beams inside a recording medium (e.g., a holographic disk). Data bits are represented by the presence or absence of microscopically sized localized holographic patterns, referred to as micro-holograms, which act as volumetric light reflectors when illuminated by a focused beam. For example, the holographic disk 10 illustrated in FIG. 1 represents how data bits may be organized in a layer of the disk 10. Generally, the holographic disk 10 is a round, substantially planar disk with one or more data storage layers embedded in a transparent plastic film. The data layers may include any number of modified regions of the material substantially localized in depth that may reflect light, such as the micro-holograms used for a bit-wise holographic data storage. In some embodiments, the data layers may be embedded in the holographic recordable material which is responsive to the illumination intensity light beams impinged on the disk 10. For example, in different embodiments, the disk 10 materials may be threshold responsive or linearly responsive. The data layers may be between approximately 0.05 μm to 5 μm in thickness and may have a separation between approximately 0.5 μm to 250 μm.

Data in the form of micro-holograms may be generally stored in a sequential spiraling track 12 from the outer edge of the disk 10 to an inner limit, although concentric circular tracks, or other configurations, may be used. A spindle hole 14 may be sized to engage about a spindle in a holographic system, such that the disk 10 may be rotated for data recording and/or reading. The disk 10 may further include different functional areas, such as lead-in, user data, and lead-out areas. The rotation of the spindle may be controlled by a feedback system to maintain a constant linear velocity or a constant angular velocity during the recording and/or reading process. Moreover, the disk spindle, the recording optics, and/or the reading optics may be moved by a translation stage or sled in a radial direction of the disk to allow the optical system to record or read across the entire radius of the disk.

Figure 2A:
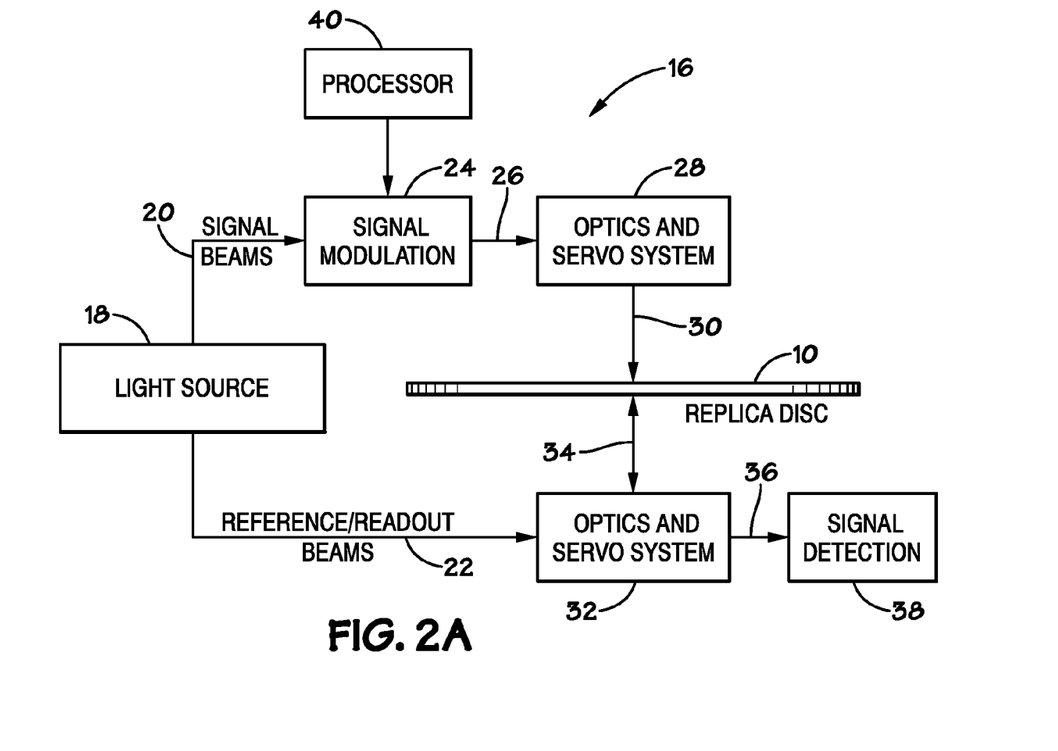
FIGS. 2A and 2B are block diagrams of micro-holographic replication systems, in accordance with embodiments.

A general system of recording micro-holograms to a replica disk 10 is provided in the block diagram of FIG. 2A. The holographic system 16 includes a light source 18 which may be split into a signal beam 20 and a reference beam 22. The signal beam 20 may be transmitted to signal modulating circuitry 24 which modulates the signal beam 20, resulting in the data beam 26. In some embodiments, a processor 40 may control the signal modulation based on data to be recorded on the replica disk 10. Further, in some embodiments, signal modulation may occur directly at the light source 18, such that light emitted from the light source 18 is directly modulated to include the data to be recorded on the replica disk 10 (e.g., in the form of the data beam 26).

The data beam 26 may be passed through another optics and servo-mechanic system 28, which may include various optical and servo-mechanic devices configured to focus the recording beam 30 on a particular location of the disk 10. For example, the optics and servo-mechanic system 28 may focus the recording beam 30 to a particular data layer or data tracks 12 in the disk 10.

The reference beam 22 may also be passed through an optics and servo-mechanic system 32 including various optics and servo-mechanic devices designed to focus the focused reference beam 34 to a particular data layer or data tracks 12 in the disk 10, such that the focused reference beam 34 overlap with the recording beam 30. Micro-holograms may be recorded in the holographic disk 10 in the interference (e.g., an illuminated spot) formed by the two overlapping counter-propagating focused laser beams 30 and 34. In some embodiments, recorded micro-holograms may be retrieved from the disk 10 using the focused reference beam 34. Reflections of the focused reference beam 34, referred to as the data reflections 36, may be received at a detector for signal detection 38.

Figure 2B:
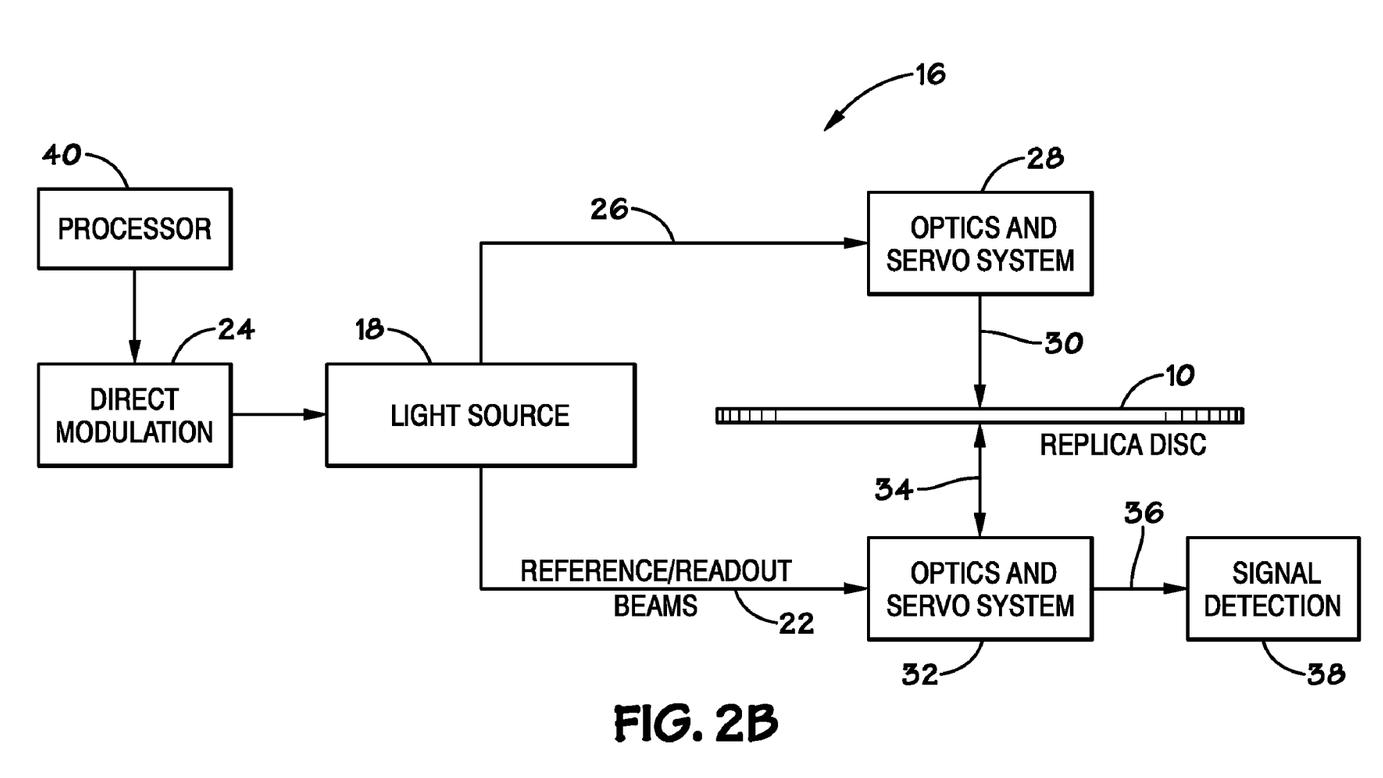

Furthermore, as provided in FIG. 2B, one or more embodiments of replication systems involve the direct modulation of the light source 18. For example, the light source 18 may be coupled to a modulator 24 suitable for directly modulating the light source 18. The modulator 24 may be controlled by a processor 40 and may modulate the light source 18 such that the modulated signal beam 26 emitted by the light source 18 includes the information to be recorded on the replica disk 10.

During the reading and replication process, a replica disk 10 may be rotated on a spindle in the holographic system. Signal beams recorded on the replica disk 10 may either be directly modulated (e.g., FIG. 2B) or modulated by suitable signal modulating circuitry 24 (e.g., FIG. 2A). Further, signal beams may be modulated by the data on a master disk, and the modulated signal beams are then directed to the replica disk 10 and overlapped with counter-propagating beams to record micro-holograms over selected tracks 12. The rotation speed of the replica disk 10 during recording and the close proximity of micro-holograms recorded onto the replica disk 10 may increase the probability of reading and/or replication errors. For example, if either or both of the focused laser beams 30 and 34 are misaligned and not impinging the correct position (e.g., data track 12 and layer) of the replica disk 10, data may be recorded to the wrong position, or no interference of the focused laser beams 30 and 34 may form, resulting in no recorded data.

Figure 3:
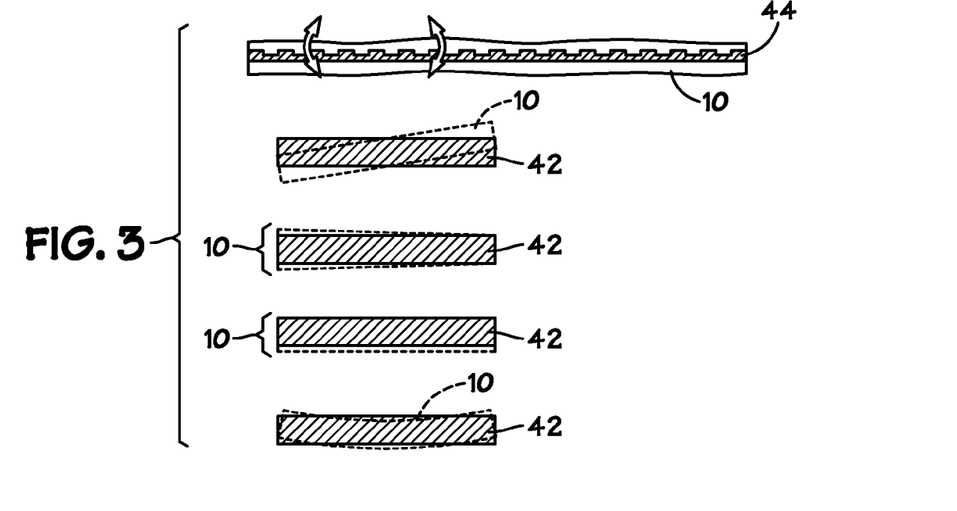
FIG. 3 is a schematic side view of several types of disk tilting or disk imperfections, in accordance with embodiments.

The accuracy and precision of the replication process may be affected by wobbling or tilting of the disk 10 with respect to the reading and replication system, by imperfections in the holographic disk 10, or by any other factor which causes the position of the disk 10 to deviate from an expected position. As illustrated in FIG. 3, the holographic disk 10 may tilt, wobble, or have imperfections, which decrease accuracy in a micro-hologram recording process. For example, the disk 10 may have an uneven surface, causing beams to impinge the disk 10 inaccurately. Inaccuracies may also result if, for example, the disk 10 is tilted with respect to an expected position 42. For example, the disk 10 may have top and bottom surfaces that are not parallel or the disk 10 may be thicker than a perfect disk 42, such that when a disk 10 is fitted on a spindle in a replication system, the position of the disk 10 or a layer of the disk 10 deviates from an expected position 42. Furthermore, the disk 10 may be warped, as represented by the curved shape of the disk 10 with respect to the expected position 42. Such inaccurate positioning or imperfections may result in micro-hologram recording errors on the replica disk 10.

Figure 4:
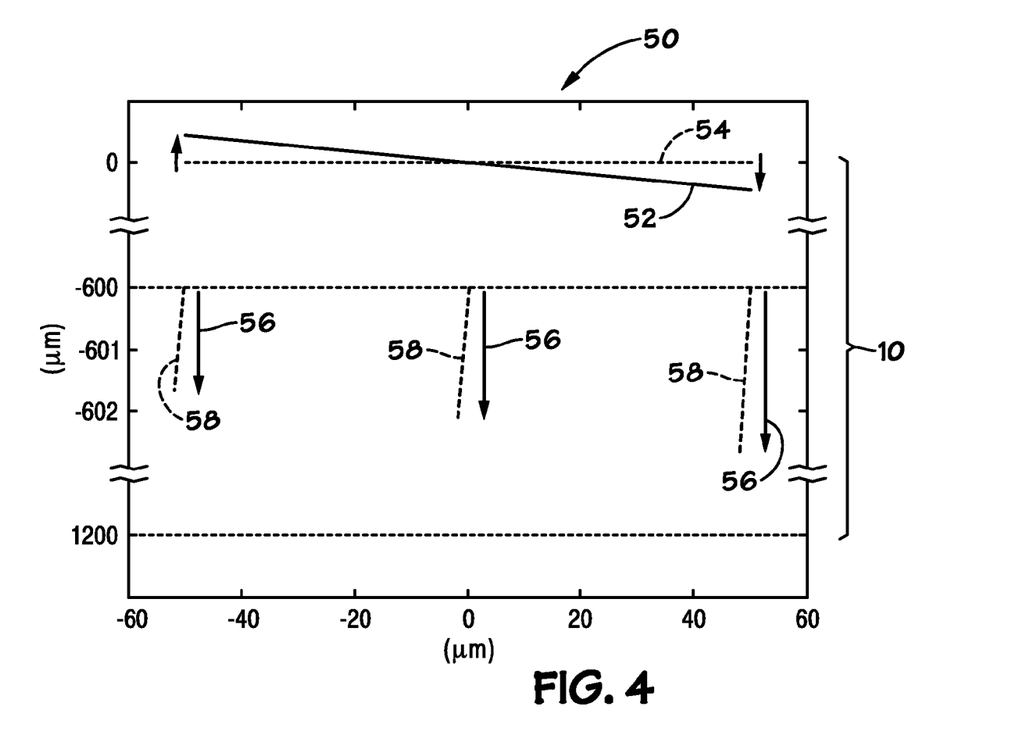
FIG. 4 is a graph representing an effect of disk tilting on illumination spots formed in a holographic disk, in accordance with embodiments.

FIG. 4 provides a graph 50 comparing expected and actual positions of data tracks 12 in a disk 10. The x- and y-axes of the graph 50 provide radial distance and axial distance (both in micrometers) of the disk 10, respectively. The radial center of a disk 10 may be at x=0 μm while the top and bottom surfaces of the disk are expected to be from y=0 μm to y=−1200 μm. As represented at y=0 μm, the top surface 52 of the disk 10 is tilted with respect to the expected position 54 of the top surface of the disk 10. This tilt may be due to a tilting or wobbling of the disk 10 with respect to the holographic recording system 16 (FIGS. 2A and 2B) during reading and/or recording, or due to imperfections of the disk 10, as discussed in FIG. 3. Disk tilting or imperfections may result in a changing distance between the surface 54 of the disk 10 and the front lens of a read or write head. Thus, if no adjustments are made to compensate for the changing distance between the disk surface 54 and the front lens, a recording beam impinged on the replica disk 10 may result in impinging a different data layer and/or a different data track 12, thereby reading and/or recording the wrong data (e.g., if the beams impinge a different track 12 than the desired track 12) or not read or record data at all (e.g., if the beams do not register to any track 12).

For example, the arrows 56 represent expected data positions to be recorded to the replica disk 10. The data positions may be on desired tracks 12 of a data layer and may range between approximately −600 μm and −602 μm from the top surface 54 of the disk 10. Due to the tilt of the disk 10, the actual illumination spots 58 may deviate from the expected illumination spots 56 both axially and radially, possibly resulting in focusing on the wrong track 12, no track, and/or in the wrong data layer, depending on the severity of the disk tilt or imperfection. Such deviations may result in inaccurately recording data on the replica disk 10, increasing the bit error rate of the holographic recording system.

Present embodiments involve focus and alignment techniques to decrease errors in replicating a disk 10. Such focus and alignment techniques may involve employing servo-mechanical devices for actuating optical components to correct focusing and/or alignment errors while recording on a replica disk 10. As discussed with respect to FIGS. 2A and 2B, servo-mechanical devices may be coupled to the optical components from which record beams are transmitted to a replica disk 10 (e.g., optical and servo-mechanical systems 28 and 32). In other embodiments, different replication systems may involve replicating a replica disk 10 while simultaneously reading from a master disk. Such embodiments may also involve using servo-mechanical devices coupled to optical components of a master disk reader for accurate reading of the master disk.

Figure 5:
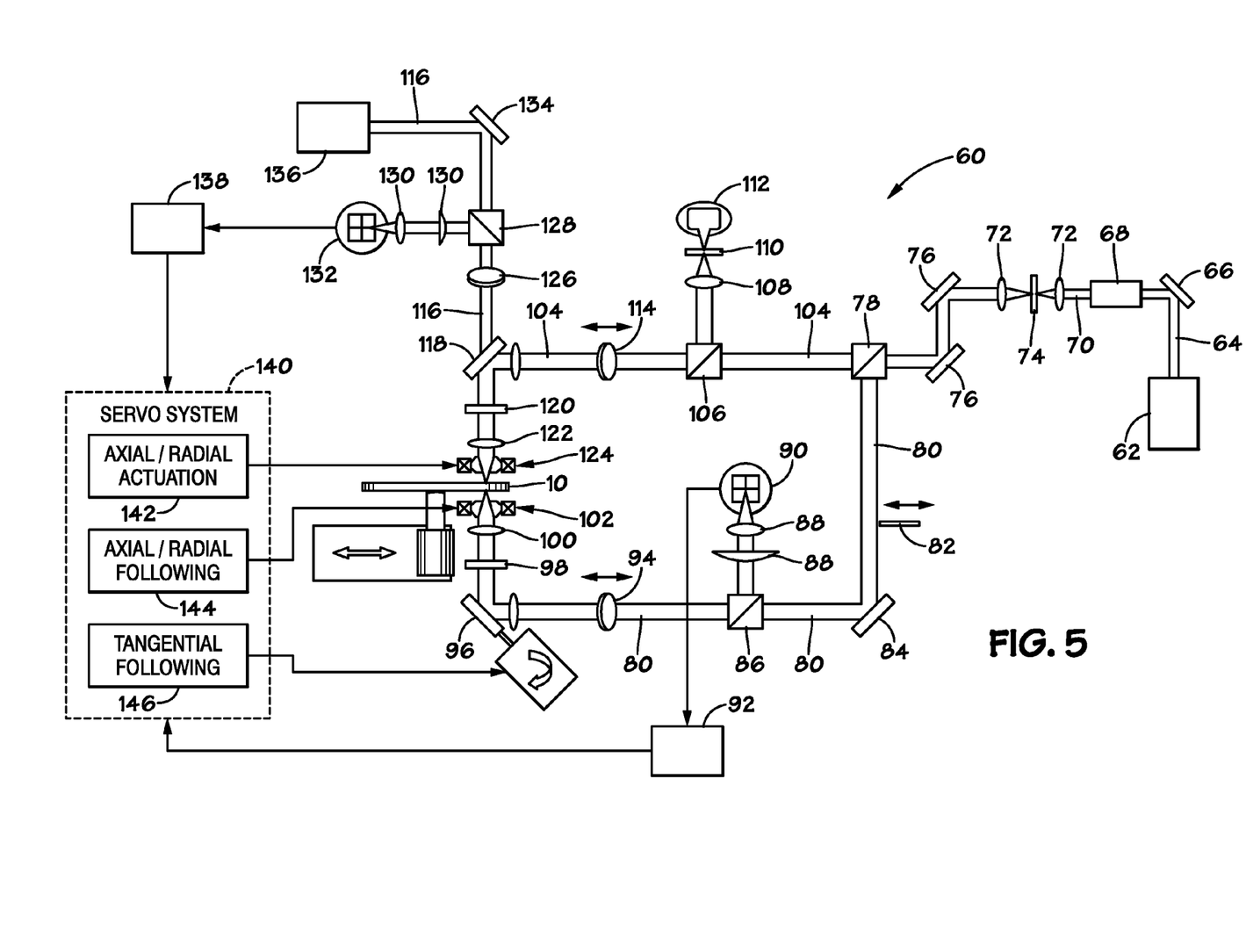
FIG. 5 is a schematic diagram of a holographic recording system, in accordance with embodiments.

FIG. 5 provides a more detailed illustration of one exemplary configuration of a holographic replication system 60. The holographic replication system 60 may include a light source 62 which emits a source beam 64 having an appropriate wavelength for micro-hologram recording and/or reading (e.g., 405 nm, 532 nm, etc.). The light source 62 may transmit the source beam 64 through various optical devices (e.g., a mirror 66) and modulated at an electro-optic modulator (EOM) 68 which electro-optically modulates the source beam 64 to produce a modulated beam 70 including the data to be written to the replica disk 10. For example, such data may include pre-recording data such as code, address, tracking data, and/or other auxiliary information, and/or other data to be recorded in the disk 10. The data beam 70 may pass through other optical elements such as lenses 72 and a spatial filter 74 which may be suitable for modulating the power and/or intensity of the data beam 70 to the replica disk 10 at different intensities throughout the replication process. In some embodiments, the data beam 70 may be reflected from other elements such as mirrors 76 before being transmitted to a polarizing beam splitter 78 which splits the data beam 78 into the recording beam 80 and counter-propagating reference beam 104 which may be oppositely impinged on the disk 10 to record a micro-hologram. Alternatively, in some embodiments, separate light sources may provide each of the recording beam 80 and counter-propagating reference beam 104.

The recording beam 80 may be transmitted through a read/write shutter which is open during recording and closed during readout of the disk 10. In some embodiments, the recording beam 80 may be reflected (e.g., by a mirror 84) and transmitted through a polarizing beam splitter 86 and a lens 94 and reflected by a galvo mirror 96. As will be discussed, the galvo minor 96 is controllable by a servo system 140 (and in particular by the tangential following components 146) and may be actuated to affect the impingement of the recording beam 80 on the disk 10. The recording beam 80 may pass through a quarter wave plate 98 and a lens 100 to an optical head 102. The optical head 102 may include optical components which focus the recording beam 80 to a desired data layer and a desired data track 12 of the replica disk 10. The optical head 102 may also be coupled to a servo-mechanical system 140, which may include servo-mechanical components which adjust components in the optical head 102 to compensate for tilting or wobbling of the disk 10 and/or imperfections of the disk 10.

The reference beam 104 may be transmitted through a polarizing beam splitter 106 and lens 114 to be reflected by a dichroic minor 118. The reference beam 104 may then pass through a quarter wave plate 120 and lens 122 to the optical head 124. The optical head 124 may include optical components which focus the reference beam 104 to the same desired layer and track 12 that the recording beam 80 is focused on, such that the reference beam 104 and the recording beam 80 constructively interfere to form an illumination spot on a desired position in the disk 10. The illumination spot may form a micro-hologram in the disk 10. In some embodiments, the optical head 124 may read reflections of the reference beam 104, and the reflected reference beam may pass through the quarter wave plate 120 and various other optical elements to be reflected by the polarizing beam splitter 106 (after having been rotated in polarization by 90° after two passes through the quarter wave plate 120). The reflected reference beam may pass through a lens 108 and a filter 110 to be detected at a confocal detector 112. Thus, the reference beam 104 may counter-propagate with the recording beam 80 to record micro-holograms in a recording process of the replication system 60, and may be reflected by the disk 10 and read at the detector 112 to read micro-holograms in a reading process of the replication system 60.

In some embodiments, an additional light source 136 may transmit a tracking beam 116 which may be impinged on the replica disk 10 along with the reference beam 104 to track the focus and alignment of the reference beam 104. The tracking beam 116 may be a different wavelength than the recording and reference beams 80 and 104. For example, the tracking beam 116 may be 658 nm or another suitable wavelength. The tracking beam 116 may be reflected by a mirror 134 and transmitted through a polarizing beam splitter 128 and a lens 126. The tracking beam 116 may have a polarity enabling it to pass through the dichroic mirror 118 to the quarter wave plate 120 and the lens 122 to the optical head 124. The optical head 124 may focus the tracking beam 116 to a tracking position in the disk 10.

The tracking beam 116 may be used to track the position of the reference beam 104 on the disk 10, as the tracking beam 116 and the reference beam 104 are each impinged on the disk 10 from the same optical head 124. For example, the tracking position targeted by the tracking beam 116 may correspond to a desired position (or target data position) of the reference beam 104. In some embodiments, the tracking position may be an encoded tracking data track in the disk 10, or a particular groove in a reference layer in the disk 10. The tracking beam 116 may be reflected from the disk 10 and may pass through the quarter wave plate 120 and through the dichroic mirror 118 and reflected by the polarizing beam splitter 128 (after having been rotated in polarization by 90° after two passes through the quarter wave plate 120). The reflected tracking beam pass through other optical elements 130 which may focus the reflected tracking beam on a quadrant detector 132. The quadrant detector 132 may be configured to measure an intensity or other quality of the reflected tracking beam. For example, the measurement may indicate whether the tracking beam 116 is properly focused on the target tracking position (corresponding to the proper focus of the reference beam 104 on the target data position). Such a measurement, also referred to as an error signal, may be indicative of a tilt, movement, and/or imperfection of the disk 10 with respect to the system 60.

Similarly, transmissions of the reference beam 104 may also be used to determine a misalignment between the reference beam and the recording beam. The reference beam transmissions may pass through the quarter wave plate 98 and may be reflected or transmitted through other optical elements to be reflected by the polarizing beam splitter 86 (after having been rotated in polarization by 90° after two passes through the quarter wave plate 98). The transmitted reference beam may pass through other optical elements 88 which may focus the transmitted reference beam on a quadrant detector 90. The quadrant detector 90, similar to the quadrant detector 132, may be configured to measure an intensity or other quality of the transmitted reference beam. Such a measurement, also referred to as an error signal, may be indicative of a misalignment between the reference beam and the recording beam.

In some embodiments, measurements or generated error signals from the quadrant detectors 132 and 90 may each be transmitted to filter systems 138 and 92, respectively (e.g., a low pass filters) which may filter the measurements above a threshold value, which may indicate that the disk 10 has a tilt, movement, and/or imperfection which must be compensated for to continue accurate replication. If the error signal exceeds a threshold, the filter systems 138 and 92 may each provide the error signals based on the reflected tracking beam and transmitted reference beam, respectively, to the servo-mechanical system 140. The servo system 140 may include axial and radial servo-mechanical components 142 configured to axially and radially actuate optical components in the optical head 124, such that the optical head 124 may compensate for any movement and/or imperfection of the disk 10 to impinge the reference beam 104 on the desired position (e.g., data layer and data track 12) in the disk 10

The servo system 140 may also be configured to actuate components in the optical head 102 to follow the actuation of components in the optical head 124. As discussed, the reference beam 104 interferes with the recording beam 80 at the target data position in the disk 10 to properly record a microhologram. Some embodiments may use following servo-mechanical components 144 in the servo system 140 to actuate the optical head 102 to follow the axial and radial actuation of the optical head 124. Therefore, the optical head 124 may actuate in axial and/or radial directions over the surface of the disk 10, and the optical head 102 may actuate in corresponding in axial and/or radial and/or tangential directions over the opposite surface of the disk 10, such that the recording beam 80 counter-propagates with and interferes with the reference beam 104 and both beams 80 and 104 are registered to a target data position in the disk 10. In some embodiments, the axial and radial actuation of the optical head 102 may be based on feed-forward focusing and tracking data of the quadrant detectors 132, as will be discussed further in FIG. 6.

The servo system 140 may also include tangential following components 146 in some embodiments. The tangential following components 146 may include servo-mechanical components configured to actuate the galvo mirror 96 to affect the impingement of the recording beam 80 in the disk 10 in a tangential-direction. In some embodiments, actuating the optical head 102 in the tangential-direction may further compensate for wobbling and tilting of the disk 10 or imperfections of the disk 10 which may cause the target data position (e.g., a particular data layer on which data is to be recorded) to change with respect to the optical head 102 in the tangential direction. In some embodiments, the tangential following components 146 may be actuated based on feed-forward information from the quadrant detectors 132.

Figure 6:
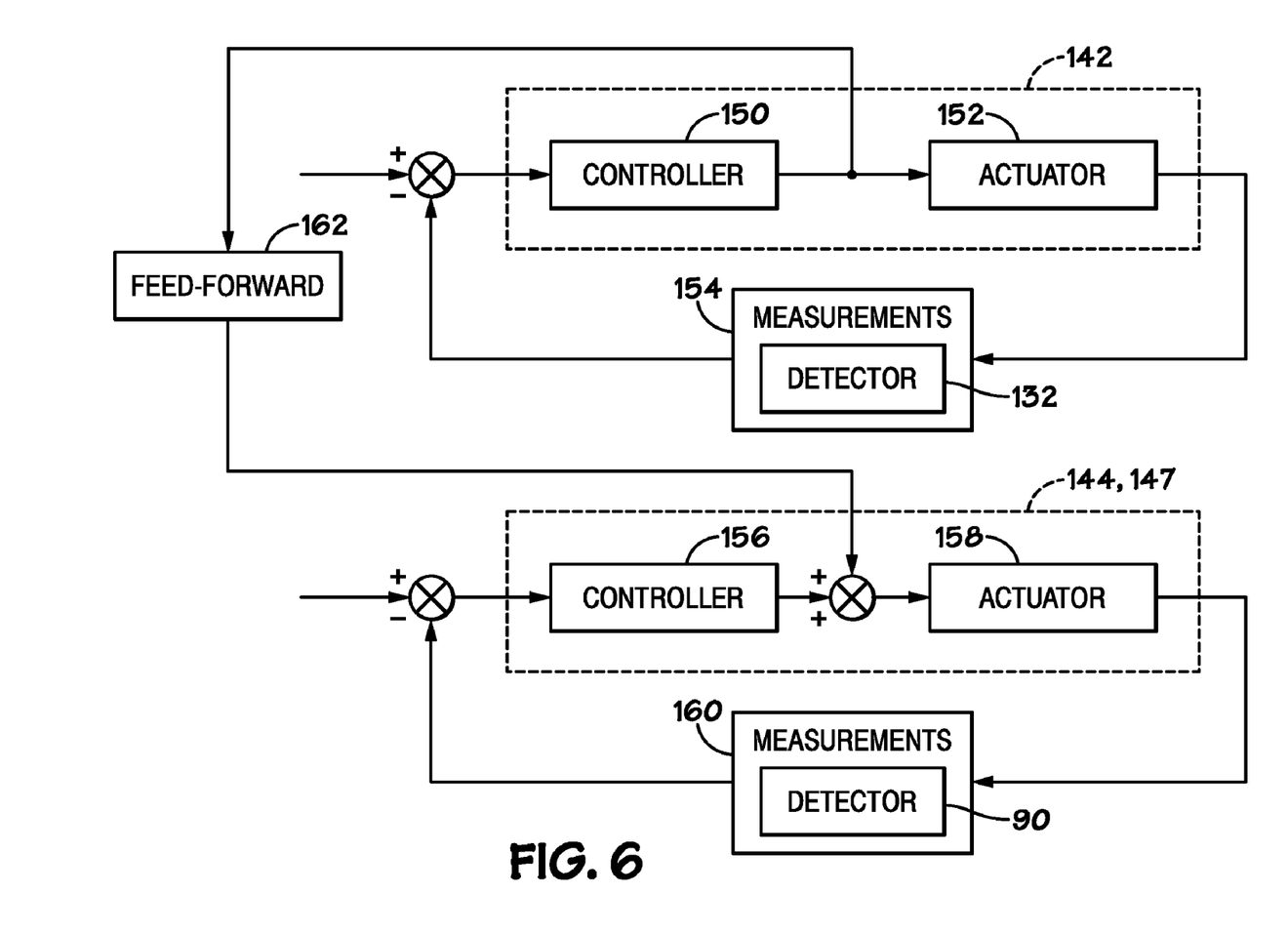
FIG. 6 is a schematic diagram of a relationship of a feed forward control system in the holographic recording system, in accordance with embodiments.

The block diagram in FIG. 6 is one example of the feed-forward relationship between the servo system 140 and the measurements of the quadrant detectors 132 and 90. The axial and radial actuation components 142 (from FIG. 5) may include a controller 150 and one or more actuators 152. The controller 150 may be suitable for controlling the positioning of the optical head 124, and the actuator 152 may be controlled by the controller 150 to actuate the optical head 124. Positioning of the optical head 124 by the axial and radial components 142 may affect the intensity of light detected at the quadrant detector 132. Throughout the replication process, and throughout the dynamic positioning by the actuator 152, the detector 132 may generate measurements 154 which may include data corresponding to misalignment of the focused recording spot on the target data position which may be caused by a tilt, wobble, and/or imperfection of the disk 10. The measurements 154 may include any information including the position of a desired position (for recording a microhologram) with respect to an expected position. The measurement 154 may be continuously (i.e., dynamically) fed back to the controller 150, which may determine (e.g., by calculating) a type and/or amount of actuation and communicate with the actuator 152 to increase or decrease a radial or axial position of the optical head in response to the most recently received measurement 154.

Similarly, the following components 144 and 147 may also include a controller 156 and one or more actuators 158. The controller 156 may be suitable for controlling the positioning of the optical head 102, and the actuator 158 may be controlled by the controller 156 to actuate the optical head 102. Positioning of the optical head 102 by the following components 144 and 147 may affect the intensity of light detected at the quadrant detector 90. Throughout the replication process, and throughout the dynamic positioning by the actuator 158, the detector 90 may generate measurements 160 which may include data corresponding to misalignment between the focus of reference beam and the focus of the recording beam.

The measurements 160 may include any information including the position of a desired position (for recording a micro-hologram) with respect to an expected position. The measurement 160 may be continuously (i.e., dynamically) fed back to the controller 156, which may calculate an actuation and communicate with the actuator 158 to increase or decrease a radial or axial position of the optical head 102 in response to the most recently received measurement 160.

In some embodiments, the actuation controlled by the controller 150 may also be fed forward (block 162) to be added to the actuation calculated by the controller 156 based on the measurements 160. As such, the actuator 158 may actuate the position of the optical head 102 to follow the position of the optical head 124, such that the recording beam 80 and reference beam 104 may interfere at the desired position (e.g., target data track 12 and data layer) of the disk 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of recording data in a holographic disk in a replication system, the method comprising:
   rotating the holographic disk;
   tracking a reference track at a target data position in the holographic disk to determine a movement measurement;
   actuating a first optical head over a first surface of the holographic disk, based on the movement measurement;
   focusing a first beam from the first optical head towards the target data position in the holographic disk;
   focusing a second beam from a second optical head to counter-propagate and overlap with the first beam to record data in the target data position in the holographic disk;
   determining an overlap misalignment between the first and the second beam; and
   actuating the second optical head over the second surface of the holographic disk, based on the overlap misalignment, wherein the second surface is opposite to the first surface.

2. The method of claim 1, wherein tracking the reference track in the holographic disk comprises:
   focusing a tracking beam on the reference track of the holographic disk from the first optical head;
   detecting a reflection of the tracking beam from the reference track to determine the movement measurement.

3. The method of claim 1, wherein determining the overlap misalignment is based on a transmission of the first beam or the second beam through the holographic disk measured by a quadrant detector in the replication system.

4. The method of claim 1, wherein the movement measurement comprises one or more of focusing error and tracking error.

5. The method of claim 1, wherein the movement measurement results from one or more of a wobbling of the holographic disk on a spindle of the replication system, a tilt of the holographic disk with respect to an expected position, and an imperfection of the holographic disk.

6. The method of claim 1, comprising communicating the movement measurement to a servo-mechanical system of the replication system.

7. The method of claim 1, wherein actuating the first optical head over the first surface of the holographic disk comprises translating a lens in the first optical head in one or more of radial direction and axial direction with respect to the surface of the holographic disk.

8. The method of claim 1, wherein the target data position comprises a data track in a data layer of the holographic disk for recording data.

9. The method of claim 1, wherein actuating the second optical head is further based on the movement measurement.

10. The method of claim 1, wherein actuating the second optical head over the second surface of the holographic disk comprises translating a lens in the second optical head in one or more of a radial direction, an axial direction and a tangential direction with respect to the surface of the holographic disk.

11. The method of claim 1, comprising adjusting an optical element in the replication system in tangential direction with respect to the surface of the holographic disk to affect the transmission of the second beam.

12. The method of claim 11, wherein the optical element comprises a galvanometer mirror.

13. The method of claim 1, wherein the second beam comprises one or more of code, address, tracking data, auxiliary information, and other data to be recorded in the holographic disk.

14. A system for recording micro-holograms on a holographic disk, the system comprising:
   a servo-mechanical system comprising:
      a first actuator configured to actuate a first optical head in one or more of an axial direction and a radial direction with respect to a first side of the holographic disk; and
      a second actuator configured to actuate a second optical head in one or more of an axial direction, a radial direction, and a tangential direction with respect to a second side of the holographic disk, wherein the actuation of the second optical head by the second actuator is based on the actuation of the first optical head by the first actuator;
   wherein the first optical head is configured to focus a first beam in a target data position from the first side of the holographic disk and wherein the first optical head is configured to focus a tracking beam on a reference track at the target data position in the holographic disk; and
   wherein the second optical head is configured to focus a second beam to interfere with the first beam in the target data position from the second side of the holographic disk, wherein the second side is opposite the first side.

15. The system of claim 14, wherein the servo-mechanical system comprises a third actuator configured to actuate a mirror that affects the focus of the second beam in one or more of a tangential and a radial direction.

16. The system of claim 15, wherein the first actuator, the second actuator, and the third actuator are each coupled to one or more controllers configured to control an actuation of the first actuator, the second actuator, and the third actuator.

17. The system of claim 14, wherein a reflection of the tracking beam from the reference track is indicative of an impingement of the first beam in the holographic disk.

18. The system of claim 17, comprising a first quadrant detector configured to detect a reflection of the tracking beam to generate a first set of error signals corresponding to a deviation between a focus position of the first beam in the holographic disk and an expected position for data recording in the holographic disk, and wherein the first actuator is configured to actuate the first optical head based on the first set of error signals.

19. The system of claim 14, comprising a second quadrant detector configured to detect a transmission of one or more of the first beam and the second beam to generate a second set of error signals corresponding to a misalignment between the focus position of the first beam and the focus position of the second beam, and wherein the second actuator is further configured to actuate the second optical head based on the second set of error signals.

20. A system for pre-formatting a holographic disk, the system comprising:
   a first optical head configured to:
      focus a first beam to a target data position in the holographic disk;
      focus a tracking beam to a reference track at the target data position in the holographic disk, wherein a reflection of the tracking beam indicates the focus of the first beam on the target data position; and
      receive the reflection of the tracking beam from the reference track;
   a second optical head configured to focus a second beam to overlap and interfere with the first beam at the target data position, wherein the second beam is counter-propagating with the first beam;
   a first servo-mechanical system configured to actuate optical components in the first optical head based on the reflection of the tracking beam; and
   a second servo-mechanical system configured to actuate optical components in the second optical head based on the transmission of one or more of the first beam and the second beam through the holographic disk.

21. The system of claim 20, wherein the first servo-mechanical system is configured to actuate an objective lens in the first optical head in one or more of a radial direction and an axial direction with respect to a data layer plane in the holographic disk.

22. The system of claim 20, wherein the second servo-mechanical system is configured to actuate an objective lens in the second optical head in one or more of a radial direction an axial direction, and a tangential direction with respect to a data layer plane in the holographic disk.

23. The system of claim 20, comprising a third servo-mechanical system configured to actuate a galvanometer mirror to change a focus of the second beam in one or more of a tangential direction and a radial direction with respect to a data layer plane in the holographic disk.

24. The system of claim 20, wherein the actuation of the optical components in the first optical head and the second optical head comprises tilting the optical components in one or more of a radial and a tangential direction with respect to the system.

25. The system of claim 20, comprising a first detector configured to detect the reflection of the tracking beam to generate a first set of error signals corresponding to one or more of a focusing error and a tracking error of a focus position of the first beam in the holographic disk.

26. The system of claim 25, wherein the first detector operates dynamically and continuously transmits the first set of error signals to the first servo-mechanical system, and wherein the first servo-mechanical system dynamically actuates optical components in the first optical head based on the first set of error signals.

27. The system of claim 20, comprising a second detector configured to detect the transmission of the first beam or the transmission of the second beam through the holographic disk to generate a second set of error signals corresponding to misalignment between the focus of first beam and the focus of the second beam in the holographic disk.

28. The system of claim 27, wherein the second detector operates dynamically and continuously transmits the second set of error signals to the second servo-mechanical system, and wherein the second servo-mechanical system dynamically actuates optical components in the second optical head based on the second set of error signals.

29. A method, comprising:
   detecting a first displacement of a focus position of a first beam from an expected data position in a holographic disk, wherein a reflection of a tracking beam from a reference track at the expected data position indicates the focus of the first beam;
   generating first set of error signals indicating the first displacement;
   actuating first optical components in a first optical system in one or more of a radial direction and an axial direction with respect to the holographic disk based on the first set error signals to compensate for the detected first displacement;
   detecting a misalignment between a focus position of a second beam and the focus position of the first beam in a holographic disk;
   generating second set of error signals based on the misalignment; and
   actuating second optical components in a second optical system in one or more of a radial direction, an axial direction, and a tangential direction with respect to the holographic disk based on the second set of error signals, to compensate for the detected misalignment.

30. The method of claim 29, wherein detecting the displacement of the target data position comprises:
   detecting one or more of a disk tilt, disk motion, and disk imperfection with respect to a holographic recording system; and
   predicting the displacement based on the detected disk tilt, disk motion, or disk imperfection.

31. The method of claim 29, wherein error signals comprise one or more of a tracking error signal, a focusing error signal, and a tilt error signal.

32. The method of claim 29, wherein the first optical components comprise one or more lenses.

33. The method of claim 29, wherein the second optical components comprise one or more lenses and galvo mirrors.

34. The method of claim 29, wherein actuating the first optical components comprises at least one of tilting and translating one or more lenses.

35. The method of claim 29, wherein actuating the second optical components comprises at least one of tilting, translating, and rotating one or more lenses and mirrors.

36. The method of claim 29, wherein compensating for the detected displacement comprises one or more of translating and tilting optical components such that a beam emitted from the optical components is registered to the target data position.

* * * * *